United States Patent [19]

Igeta

[11] 3,977,696
[45] Aug. 31, 1976

[54] SEAT BELT EQUIPMENT
[76] Inventor: Harutoshi Igeta, No. 1518, Kre-cho, Higashisumiyoshi, Osaka, Osaka, Japan
[22] Filed: Feb. 26, 1975
[21] Appl. No.: 553,218

Related U.S. Application Data
[62] Division of Ser. No. 484,333, June 28, 1974, abandoned.

[30] Foreign Application Priority Data
July 11, 1973  Japan............................. 48-83584

[52] U.S. Cl. .............................................. 280/744
[51] Int. Cl.² ........................................ B60R 21/00
[58] Field of Search.................. 280/150 SB, 150 B; 180/82 C

[56] References Cited
UNITED STATES PATENTS
3,554,577  1/1971  Hane .............................. 280/150 SB
3,830,518  8/1974  Silber ............................ 280/150 SB
3,833,239  9/1974  Coenen .......................... 280/150 SB Primary Examiner—Robert R. Song
Attorney, Agent, or Firm—Wenderoth, Lind & Ponack

[57] ABSTRACT

A seat belt system for a car has a belt which stretches between the lower portion of the side of the car seat and the car's ceiling. At the upper terminal of the belt on the ceiling is a swinging arm or a track, the upper terminal of the belt engaging with a fixing member on the arm or a sliding member slidable along the tract. The rotatable arm is rotatable and the slidable member is slidable to move the upper terminal of the belt from a position in which the belt is out of the way of the seat to a position in which the belt is across a person seated in the seat.

3 Claims, 20 Drawing Figures

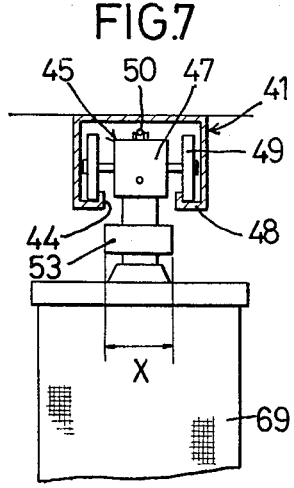
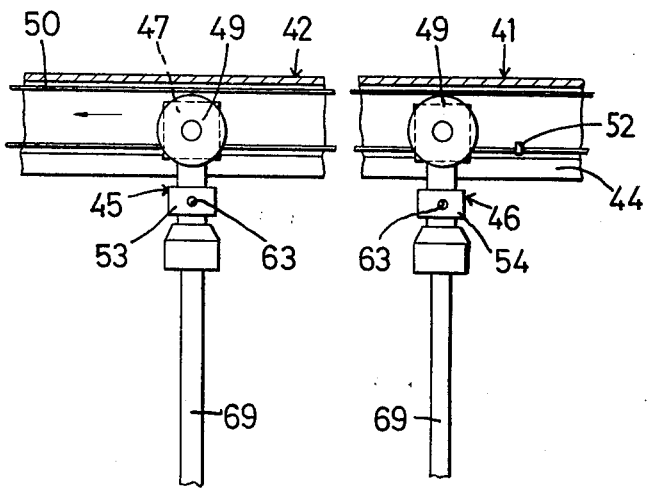
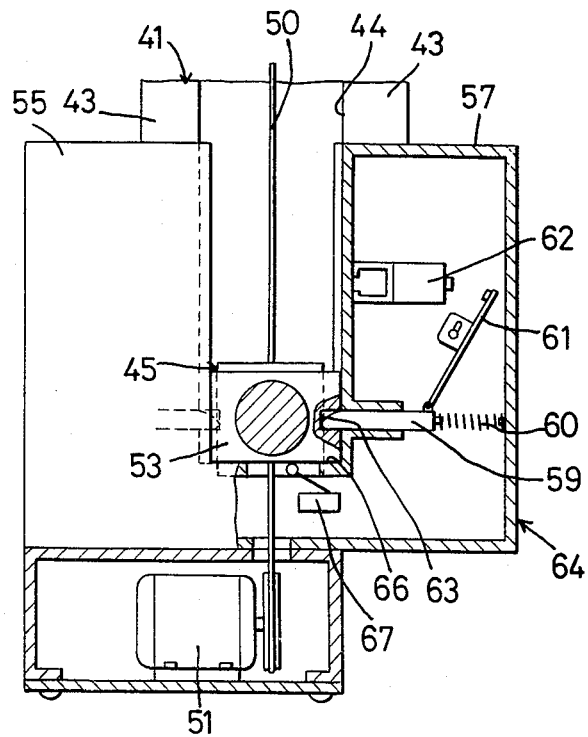

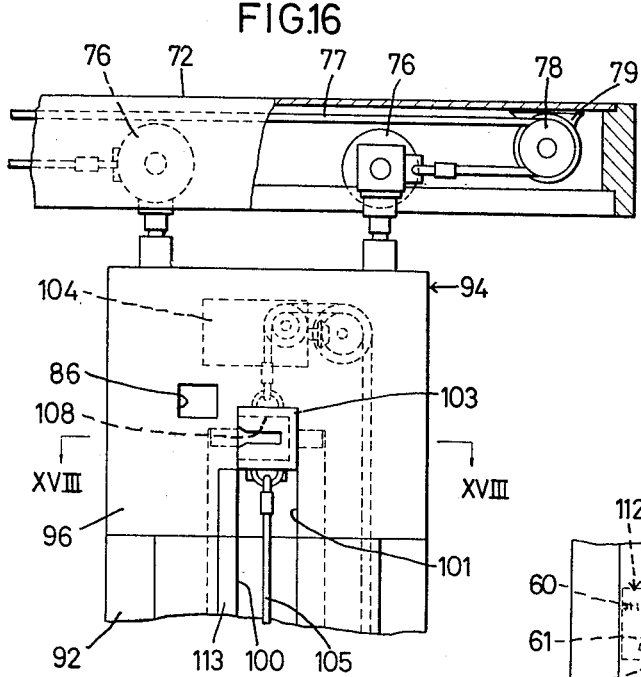
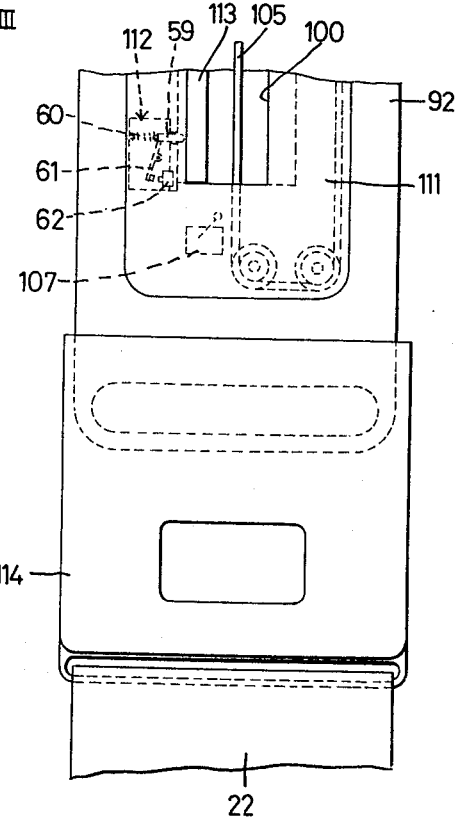

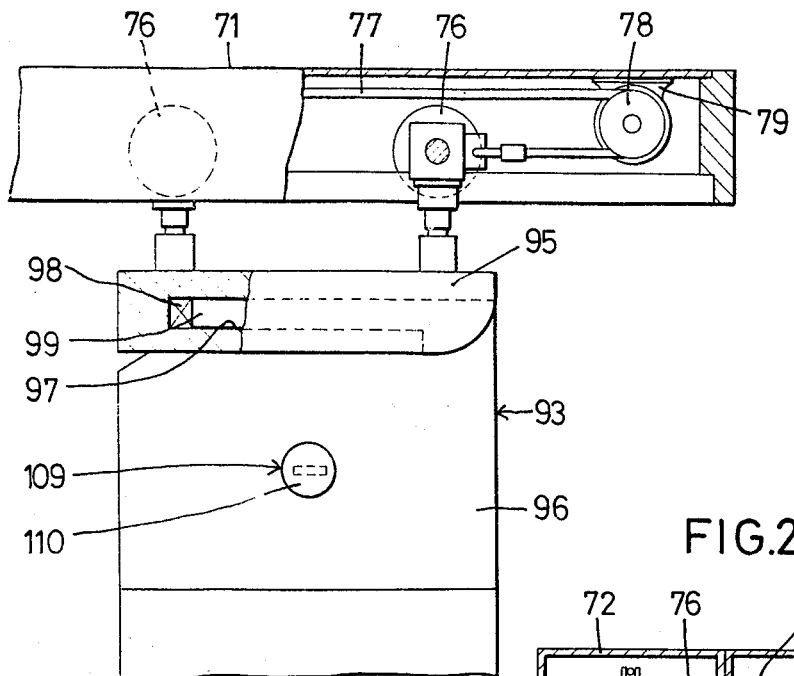
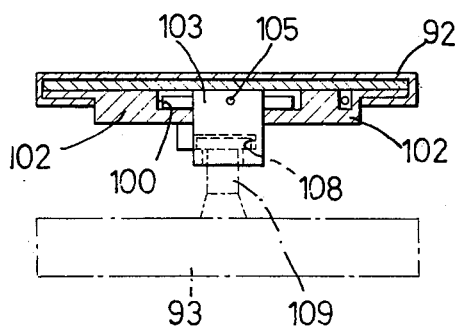
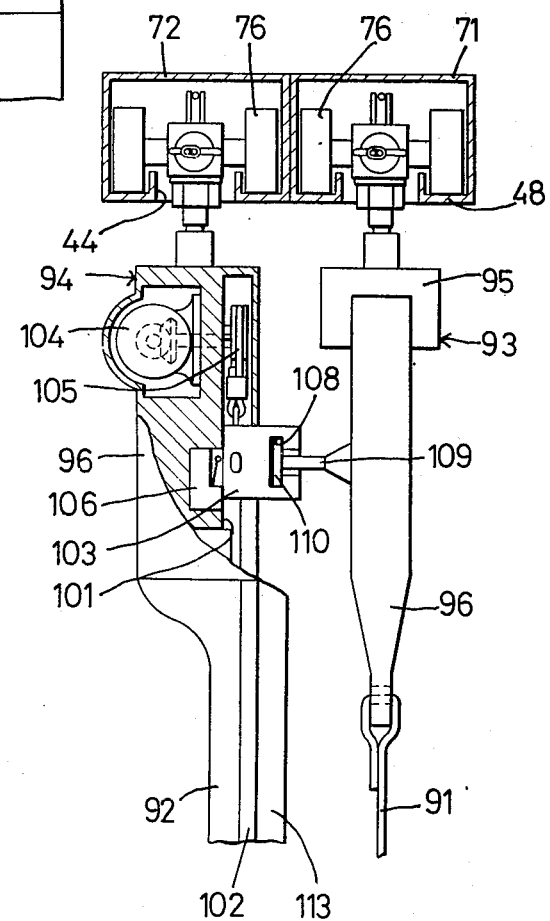
FIG.19
FIG.20
FIG.18

SEAT BELT EQUIPMENT

This is a division of application Ser. No. 484,333, filed June 28, 1974 now abandoned.

The present invention relates to a seat belt device for securing the body of a person riding in a car against accidents such as collisions and the like. This seat belt has a simple mechanism and needs no buckles and the like.

BACKGROUND OF THE INVENTION

Conventionally, devices of this kind have been used and are roughly divided into two categories. (1) two-point supporting systems in which the belt for stretching over the user from his waist to shoulder is fixed at one end thereof to one side of a lower portion of the seat and at the other end thereof to the other side of the seat at an upper portion thereof, and (2) three-point supporting systems which comprise two belts, one belt for fastening around the waist and the other across the shoulder of the user.

The foregoing conventional seat belts, however, never dispense with the buckle which is troublesome to handle; therefore, the user tends to neglect wearing said seat belts. Also, the conventional seat belt is inconvenient to store when unused.

SUMMARY OF THE INVENTION

The present invention not only dispenses with the troublesome buckle, but also enables automated wearing of said seat belt.

A first object of this invention is to provide a seat belt device wherein a belt stretched between the ceiling and the seat in a car makes a traverse at its upper end on a predetermined track thereby enabling it to fit over the user's body.

A second object of this invention is to provide a seat belt device as described above, wherein said traverse of said belt is carried by a rotary arm installed in the car.

A third object of this invention is to provide a seat belt device as described above, wherein said belt at its upper end makes a trip along a rail provided in the car.

A fourth object of this invention is to provide a seat belt device comprising two belts functioning in the same manner as the above, said belts at their upper ends moving in directions opposite to each other, thereby fitting simultaneously over the rider's waist and shoulder.

BRIEF DESCRIPTION OF THE DRAWINGS

These objects of this invention can be accomplished by the improvement, combination and operation of every part constituting this invention, the preferred embodiments of which will be clarified in the annexed drawings and illustration given below.

FIG. 7 is a longitudinal sectional elevation of another shifting means in the above.

FIG. 8 is a longitudinal side view of the above-mentioned two shifting means while moving.

FIG. 9 is a longitudinal sectional view in elevation of a locking system of one shifting means as described above.

FIG. 16 is a magnified, partially-cutaway side view showing the upper construction of one belt in the above.

FIG. 17 is a magnified, side view of one belt at the lower construction thereof.

FIG. 18 is a sectional view of the portion between the arrow-marked XVIII — XVIII in FIG. 16.

FIG. 19 is a magnified, partially-cutaway side view of the other belt at the upper construction thereof in FIG. 15.

FIG. 20 is a longitudinal plan view showing the two belts passing each other at the upper constructions thereof in FIG. 15.

DETAILED DESCRIPTION OF THE INVENTION

In the first embodiment shown in FIGS. 1 to 4, letter A designates a seat in a car B, said seat A at its lower side part being equipped with a belt winder 21. The belt winder 21 stores a flexible belt 22 in the lower end portion thereof so as to enable the belt 22 to extend therefrom by a predetermined length as needed and the belt 22 is fixed at its lower end to the winder 21.

Figure 1:
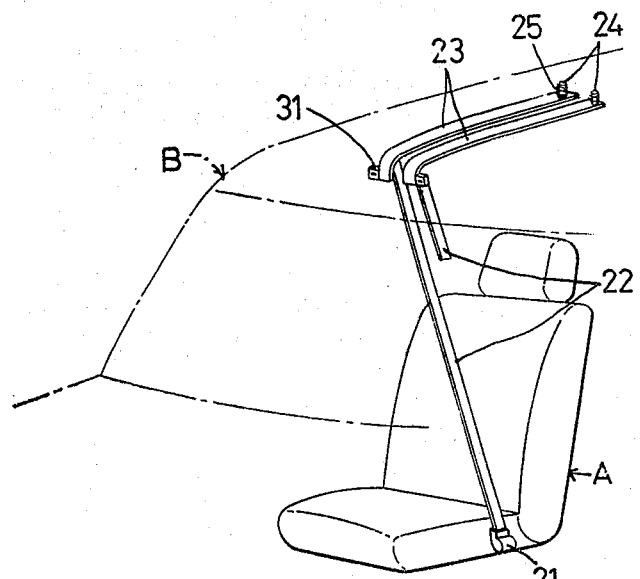
FIG. 1 is a perspective view of this invention before being put into use in the first embodiment.

A rotary arm 23 is fixed to the ceiling of the car B above the side of the seat A wherein said belt winder 21 is installed, said arm 23 being fixed at its base portion to the ceiling by a pivot 24. This arm 23 rotates horizontally at its forward tip around said pivot 24 within a realm ranging from the forward direction as shown in FIG. 1 to a direction toward the central pillar C of the car B. The rotary arm 23 incorporates a spring 25 so as to force the arm 23 to return to the forward situation.

Figure 3:
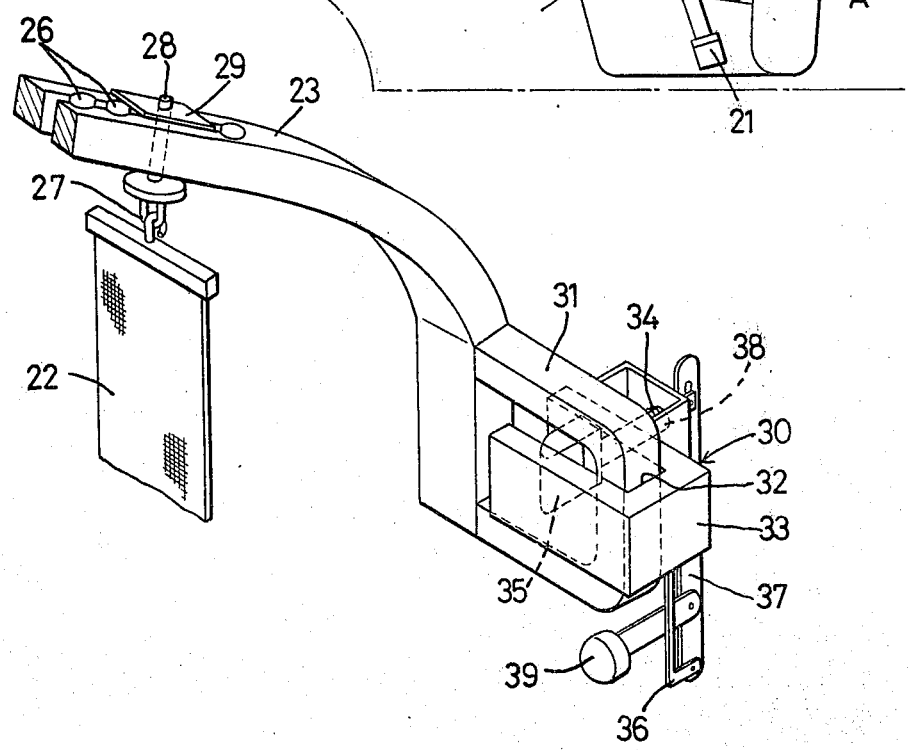
FIG. 3 is a perspective view of an arm at the forward tip thereof and a locking system for locking said arm in the above.

The belt 22 when extended out of the winder 21 is connected at its upper end to the forward tip of the rotary arm 23 in a mechanism as shown in FIG. 3. A spiral rod 28 linked to the belt 22 at its upper end via a joint 27 is inserted into a fixing orifice 26 provided in a plural member at the forward tip of said rotary arm 23, said spiral rod 28 projecting above the surface of said arm 23 being tightly fixed with a screw 29 therewith.

The rotary arm 23 in rotating at its forward tip toward the central pillar C draws the belt 22 toward the central pillar C, brings said belt 22 over the seated user and covers him from waist to shoulder. The position of said belt 22 to accord with the individual length preference of the user is easily adjustable by choosing the proper fixing orifice 26 in the rotary arm 23.

The central pillar C at its inside upper portion has a locking system 30 for securing thereto the rotary arm 23 at the forward tip thereof. Said locking system 30, shown in FIGS. 3 and 4, comprises a projecting engaging ring 31 on its side which directs forward at the time of rotation of said arm 23 toward the central pillar C.

The central pillar C is equipped at the inward projecting part thereof with a frame 33 which incorporates a concave portion 32 wherein the engaging ring 31 is to fit following the rotation of the arm 23 toward the central pillar C. The aforementioned frame 33 at one side thereof has a locking click 35 which at its forward tip is flexible and free to go in and out of said concave portion 32. A spring 34 is provided for pushing the locking click 35 into said concave portion 32.

The locking click 35 is tapered at its forward end enabling to escape automatically from the concave portion 32 as the angaging ring 31 advances into said concave portion 32, thus allowing the engaging ring 31 to pass freely therethrough. Said locking click 35 after the insertion of said engaging ring 31 in the concave portion 32 again projects into the concave 32 under the biasing effect of the spring 34 and locks the engaging ring 31 therein.

Figure 4:
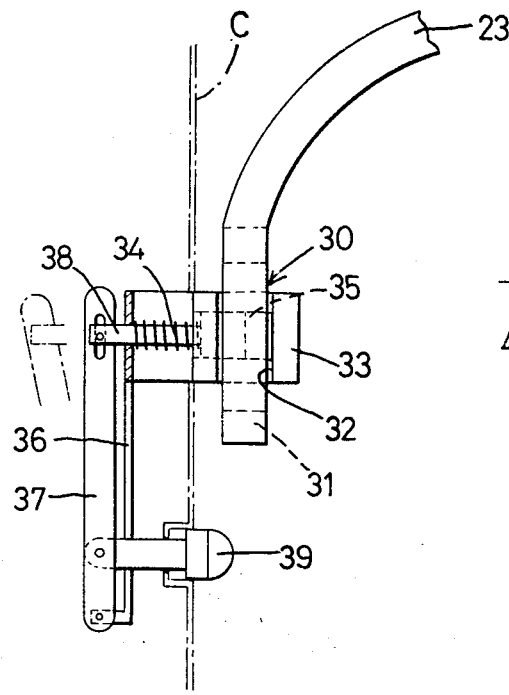
FIG. 4 is a partially-cutaway longitudinal section of the above.
Figure 6:
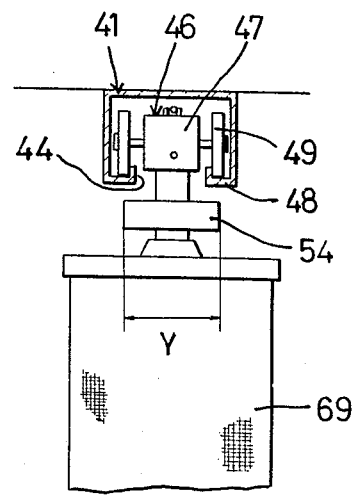
FIG. 6 is a longitudinal sectional elevation of a shifting means incorporated in the above.

The locking system 30 further comprises means for releasing the locking click 35 from engagement. This means is incorporated within the central pillar C and comprises a downward-projecting fixing piece 36 fixed to the frame 33, said fixing piece 36 being connected to a rod 37 at its lower end. Said rod 37 at its upper end is connected to a pivotal member 38 which is fixed to the locking click 35, and inbetween both ends thereof there is connected a push button 39 projecting at its forward end toward the interior of the car. Pushing said push button 39 moves the rod 37 to a position as shown in FIG. 4 by the chain lines; the locking click 35 moves back from the concave portion 32 against the resilience of the spring 34 and is released from the engagement.

This invention in the first embodiment so organized as explained theretofore is operated as follows.

(FIG. 1 shows one of the two seat belts to be equipped at the seats of the driver and a passenger in a car.)

Figure 2:
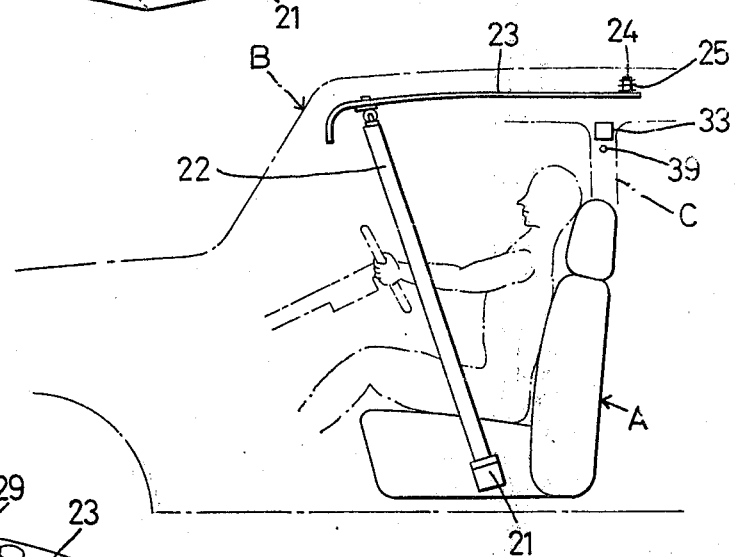
FIG. 2 is a side view of the above.

When the seat belt equipment is not in use, the rotary arm 23 at its forward end is directed forward toward the front of the car B, and the belt 22 stretches nearly vertically at one side of the seat A as shown in FIGS. 1 and 2.

After setting the belt 22 to the seat A in the above-described state, the rotary arm 23 is manually rotated toward the outside of the car. When the rotary arm 23 rotating around the pivot 24 abuts the central pillar C, the engaging ring 31 at the forward terminal of the locking system 30 interposes into the concave portion 32 of the frame 33, engages said engaging ring 31 with the locking click 35, and secures the rotary arm 23 in a state directed toward the central pillar C.

By rotating said rotary arm 23 toward the central pillar C, the belt 22 at the upper end thereof makes a trip on the arc-shaped track centering around the pivot 24. The belt 22 is, thereby, laid aslant over the person sitting on the seat A from waist to shoulder, and the locking of the arm 23 by the locking system 30 holds the belt 22 at its upper end at a predetermined position at the upper back of the shoulder portion. The user is, accordingly, safely secured to the seat A by the belt 22.

The push button 39 is available for releasing the person from the belt binding. By pushing the push button 39 against the spring 34, the locking click 35 pulls away from the engaging ring 31 by withdrawing from within the concave portion 32. The rotary arm 23, under the effect of the spring 25, returns to the state of pointing its forward tip toward the front of the car B, and the belt 22 at its upper end returns to the side of the seat A, thereby releasing the person from the restraining effect of the belt 22.

The manual operation of the rotary arm 23 as introduced in the foregoing first embodiment may, of course, be replaced with a motorized operation and the like.

The second embodiment of this invention shown in FIGS. 5 to 10 will be explained hereinunder and parts equivalent to those in the first embodiment will be omitted from illustration but are denoted by the same numerals or marks.

A rail 41 is comprised of a ceiling portion 42 fixed to the car's ceiling right above the seat A, and a wall portion 43 connected to one edge of said ceiling portion 42 and pointed downward along the inside of the central pillar C. A split groove 44 is formed all through the rail 41 at the underside and inside surfaces of said ceiling portion 42 and wall portion 43.

In said rail 41, the ceiling portion 42 is formed like a plane letter "u" and covers the distance from the seat A at the side in the rear part to the other side in the rear part via the front of the seat A. The wall portion 43 abuts at the lower end thereof on the lower portion of the seat A and is connected to the ceiling portion 42 at the outward-looking end portion thereof and forms a gentle curve therefrom.

The rail 41 is provided with a pair of shifting means 45 and 46 movable thereon, said shifting means 45 and 46 each comprising a main body 47 and a wheel 49. Said wheel 49 rolls along the rail 41 on both the inside bottom walls 48 thereof which form said split groove 44 therein. Said wheel 49 is secured at both sides of the main body of the shifting means 45 and 46 within the rail 41.

The rail 41 further incorporates therein an endless wire 50 which stretches from the ceiling portion 42 to the wall portion 43, said wire 50 being carried by pulleys suitably arranged therein and driven by a motor 51 installed in the wall portion 43 at the end thereof.

The first shifting means 45 is fixed somewhere to the wire 50 and moves in accordance with the rotation on the rail 41 of the wire 50, while the second shifting means 46 remains independent of the wire 50 itself.

The wire 50 has a fixing piece 52 at a predetermined distance from said first shifting means 45, said fixing piece 52 engaging said second shifting means 46 during the afore-described rotation of said wire 50 and movement of said first shifting means 45 from the ceiling portion 42 to the wall portion 43, thus enabling said second shifting means 46 also to move in accordance with the rotation of the wire 50.

Both of said shifting means 45 and 46 are provided with flanges 53 and 54, respectively, projecting from the split groove 44. Said flanges 53 and 54 are different in width; the width X of the first flange 53 is larger than the width Y of the second flange 54.

In the rail 41, on the side where the split groove 44 is open at the upper terminal of the wall surface portion 43, said first flange 53 is allowed to pass freely, but the second flange 54 of the second shifting means 46 is blocked by the operation of a locking system 55 adapted therein.

Figure 10:
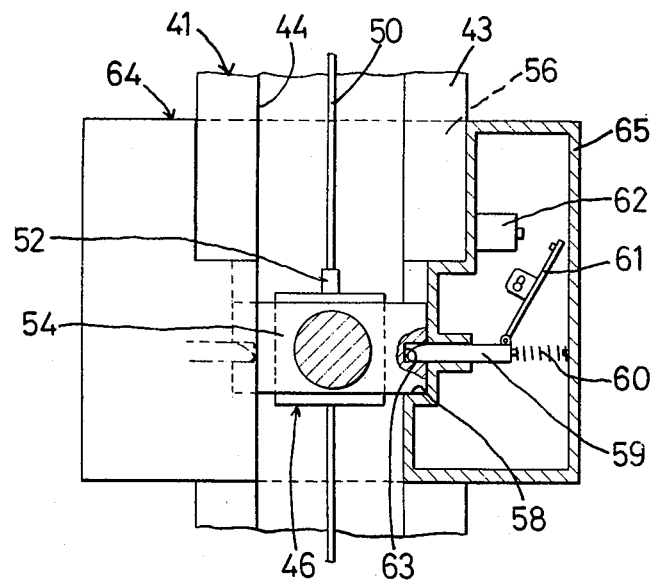
FIG. 10 is a longitudinal sectional view in elevation showing a locking system of the other shifting means as referred to above.

The foregoing locking system 55 as shown in FIG. 10 is secured to a fixing panel 56 attached to the rail 41. A pair of hollow projections 57 sandwich the split groove 44 at both sides thereof, so that the two projections 57 at their confronting sides keep a distance longer than the afore-mentioned width X of the one flange 53. In said space a recessed portion 58 is formed in which both side terminals of the second flange 54 fit at the termination of their downward traverse.

Both of the projections 57 incorporate respectively a locking claw 59 which is allowed to make at the forward tip thereof free insertion into and withdrawal from the recessed portion 58, a spring 60 for giving a resilience to said locking claw 59 toward the recess portion 58, and an electric magnet 62 for magnetically rotating an arm rod 61 linked to the locking claw 59 following supply electricity thereto, thereby allowing the locking claw 59 to be inserted into the recessed portion 58.

The flange 54 is provided at both sides thereof with a concave portion 63 with which the locking claw 59 at the forward tip thereof engages when the flange 54, after fitting into the recess portion 58, is no longer movable in the forward direction. The locking claw 59 is tapered at the forward tip thereof so as to be engageable with the concave portion 63 under the resilient effect of said spring 60. Said locking claw 59 before engaging automatically withdraws from the recess portion 58 in accordance with the advance of the flange 54 toward said recessed portion 58.

In the rail 41 at the lower edge of the wall portion 43 is a locking system 64 for the first shifting means 45. Said locking system 64, nearly equal in organization with the other locking system 55 as shown in FIG. 9, is formed at a position where the hollow projection 65 fixed in front of the split groove 44 overlaps the split groove 44 and has a recess portion 66 which is wide enough to admit therein the width X of the flange 53.

The hollow projection 65 incorporates therein the locking claw 59, the spring 60, an arm 61 and a solenoid 62 on both sides, the concave portion 63 with which the locking claw 59 engages also being provided on both sides of said flange 53. At the lower terminal of the recess portion 66 in the hollow projection 65 there is arranged a switch 67 which communicates with the motor 51 to cut the power supply to said motor 51 after pressure is applied to said switch 67 by the flange 53.

To allow the flanges 53 and 54 to fit simultaneously into the recessed portions 58 and 66 of the locking systems 55 and 64, respectively, the space between the shifting means 45 at the wire 50 and the fixing member 52 for pressurizing the other shifting means 46 is adjusted in accordance with the space between the two locking systems 55 and 64.

Figure 5:
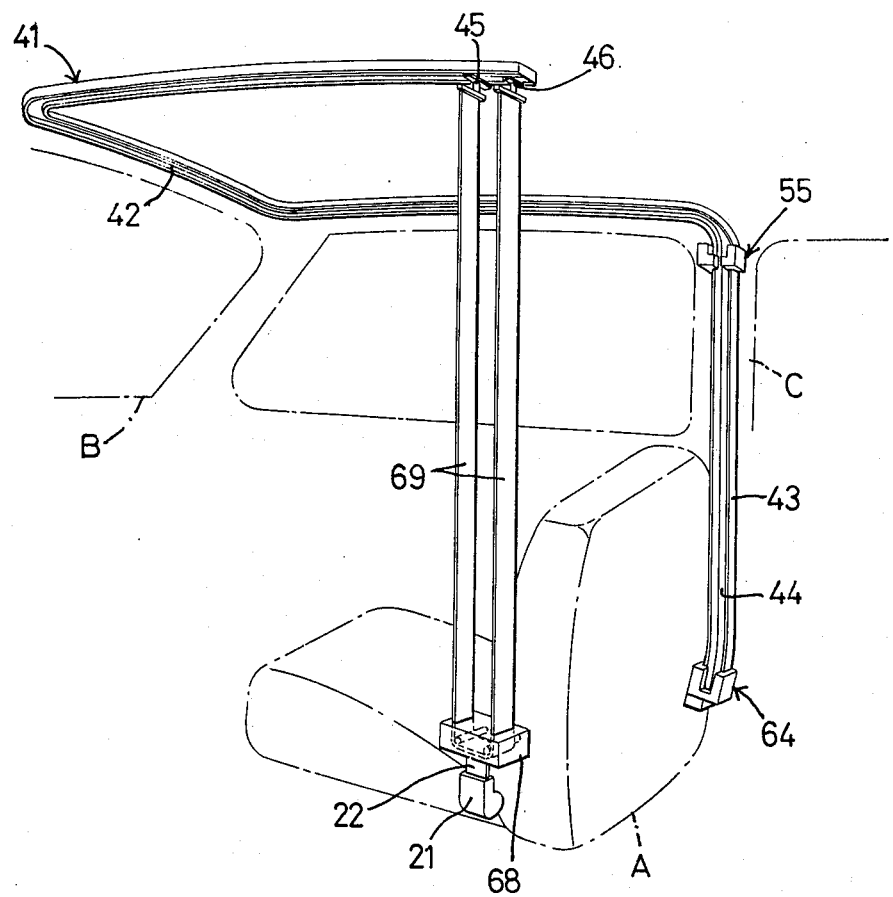
FIG. 5 is a perspective view of this invention in the second embodiment.

Also, as shown in FIG. 5, said winder 21 is fixed to the lower portion of the seat A at the rear side thereof, and a belt 22 extending out of said winder 21 has at the upper end thereof a belt retainer 68. Said retainer 68 holds a belt 69 at its two-folded portion by means of penetrating therethrough, thus allowing the belt 69 to move from one end to the other longitudinally under the guide of said retainer 68.

The two folded belt 69 at one upper end thereof is linked rotatably to the lower portion of the flange 53 and at the other upper end, also rotatably, to the lower portion of the flange 54.

The belt 69 at both ends thereof moves along the rail 41 in accordance with the movement of the shifting means 45 and 46, i.e., the traverse of the first shifting means 45 toward the wall surface portion 43 at the lower edge thereof results in the fixation of the belt 69 over the waist portion of the seated person. The second shifting means 46 moving toward the wall portion 43 at the upper terminal thereof brings the other side of the belt 69 aslant over the user from shoulder to waist. Fitting the belt 69 over the shoulder portion is easily adjustable by means of shifting the other locking system 55 along the rail 41 and by situating the fixing piece 52 along the wire 50 in accordance with the above.

The seat belt device of this invention in the second embodiment is so organized as described and functions as follows.

When the seat belt is not in use, both shifting means 45 and 46 are located close to each other at the end of the ceiling portion 42 of the rail 41, and the belt 69 is folded into two folds stretching at each fold upward and downward at one side of the seat A as shown in FIG. 5.

In the above-described situation, a person sitting on the seat A turns on a switch (not shown) to supply power to the motor 51. As the result of the clockwise rotation of the motor 51 rotating the wire 50, the first shifting means 45 begins to move along the rail 41 and moves the belt 69 at its upper end on one side thereof from the seat A to the other side upper portion thereof.

After the traversing of the first shifting means 45 a predetermined distance, the fixing piece 52 of the wire 50 reaches the second shifting means 46 and applies a pushing pressure thereto. This results in the traversing also of the second shifting means 46 and the second shifting means 46 also pulls the belt 69 at the other end thereof.

As both of the shifting means 45 and 46 move while keeping a predetermined distance in between each other, the first shifting means 45 first passes through the first locking system 55 on the wall surface portion 43 at the upper terminal thereof. The flange 53 of the first shifting means 45 is narrower in width than the space between the confronting two hollow projections 57 and causes no effect on the first locking system 55, thus allowing the shifting means 45 to traverse through said locking system 55 toward the lower end of the wall surface portion 43.

As both of the shifting means 45 and 46 further traverse until reaching the ends, the first shifting means 45 fits into the recessed portion 66 of the locking system 64 at the lower edge of the wall surface portion 43 and pushes the switch 67 to cut the power supply to the motor 51. Then the locking claw 59 engages both sides of the concave portion 63, and secures the first shifting means 45 as shown in FIG. 9.

One side of the belt 69 after the afore-described traversing fits over the user and acts as a waist belt.

Simultaneously with the locking of the first shifting means 45 by the second locking system 64, the second shifting means 46 fits into the recess portion 58 of the first locking system 55, thus enabling the locking claw therein to engage with both concave portions 63 and secure the second shifting means 46 as shown in FIG 10.

The side of the belt 69 traversed by the second shifting means 46 fits over the user from waist to shoulder, and becomes a shoulder belt.

By locking both of the shifting means 45 and 46, the belt 69 perfectly secures the waist and shoulder portion of the user to the seat A.

To release the user from the belt binding, another switch (now shown) is provided in the car exclusively for the releasing purpose. Said switch supplies power to the motor 51 for its reverse operation and magnetizes the electric magnet 62 incorporated in each of the locking systems 55 and 64. The magnetism attracts the locking claws 59 and releases the shifting means 45 and 46.

Simultaneously with the above, due to the reversed rotation of the wire 50 by the motor 51, the first shifting means 45 first starts rising along the wall portion 43 of the rail 41 until it hits the second shifting means 46 which is stationary at the upper portion of said wall portion 43. The force applied to the second shifting means results in the paired trip of the shifting means 45 and 46, one following the other, toward the ceiling portion 42, thereby releasing the user from the belt 69.

When the shifting means 45 and 46 return to the ceiling portion 42 at the end thereof return to the state as shown in FIG. 5, either the shifting means 45 or 46 may push a switch (not shown) suitably adapted on the rail 41 to cut the power supply to the motor 51.

Explanation of the third embodiment shown in FIGS. 11 to 14 is given below. Parts equivalent to those in the first and second embodiments have the same numerals or marks and are accordingly omitted from the explanation.

Figure 13:
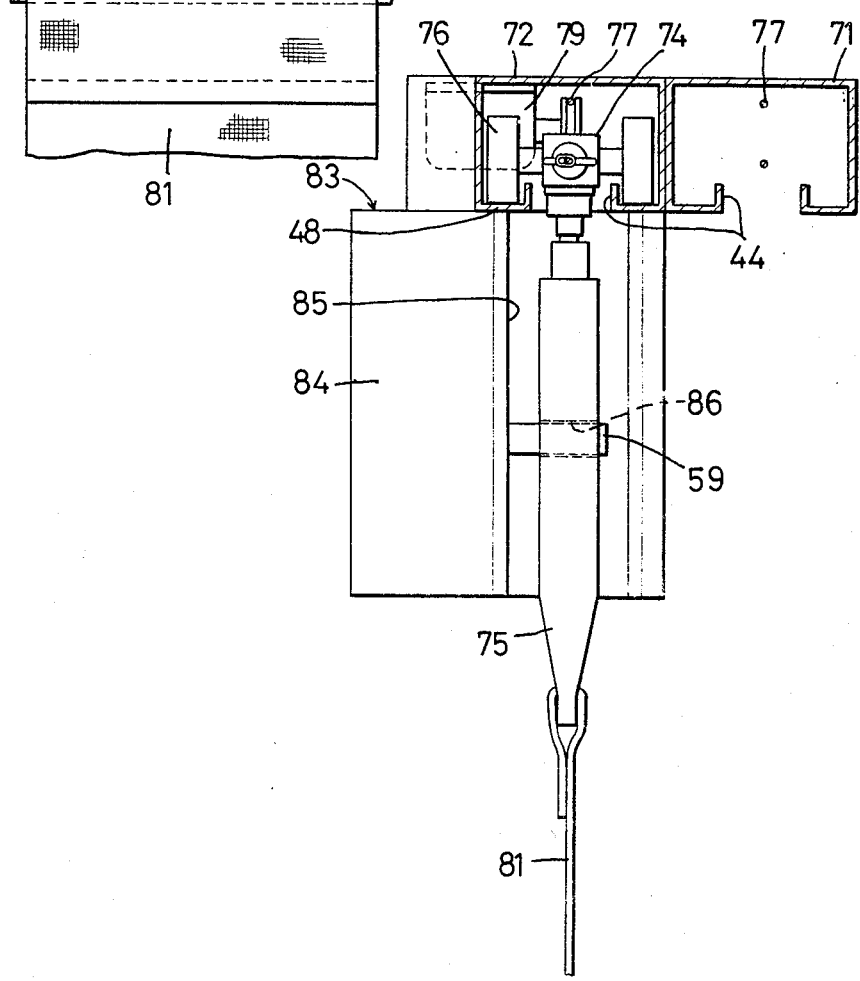
FIG. 13 is a longitudinal sectional view in elevation of a locking system provided in the above.

Two rails 71 and 72 in the formation of plane "u" letter are fixed side by side to the ceiling at the position just above the seat A, as shown in FIG. 13. These rails 71 and 72 are each equipped with a split groove 44 at a sectionally formed lower surface thereof, and are provided with shifting means 73 and 74, respectively. Said shifting means 73 and 74 are suspended from said shifting means 73 and 74 are suspended from said rails 71 and 72.

Each of the shifting means 73 and 74, at the upper surface of both terminals of a rectangular metal fixture 75 thereof, comprises a wheel portion 76 for rolling over the rails 71 and 72 across the bottom walls 48 thereof which are provided so as to sandwich the split groove 44 and allow the shifting means 73 and 74 to move as required on the railse 71 and 72.

The rails 71 and 72 each incorporate an endless wire 77 by suspending it from pulleys arranged in said rail 71 and 72. Said wire 77 is rotated by pulleys 78 driven under power of a motor 79 arranged suitably along the rail 71 and 72 at the terminal portion thereof. This rotation of the wire 77 is conducted separately in each of the rails 71 and 72. Said wires 77 are also somewhere therealong fixed to the wheel portion 76 of the shifting means 73 and 74.

Accordingly, the shifting means 73 and 74 are able to make a confronting traverse along the rail 71 and 72 due to the reversed operation of the motor 79.

A belt winder 21 is secured to both of the lower rear side portions of the seat A.

The upper end of the first belt 80 drawn out of a first winder 21 is connected to the lower portion of the metal fixture 75 attached to the first shifting means 73 on the outer side rail 71, whereas the upper end of the second belt 81 from the second winder 21 is connected to the lower portion of the metal fixture 75 on the second shifting means 74 of the inside rail 72.

When both shifting means 73 and 74 are at each end of the rails 71 and 72 respectively and are positioned above each belt winder 21, both of the belts 80 and 81 are stretched upward and downward respectively at both sides of the seat A. In the rails 71 and 72 at both ends thereof where the shifting means 73 and 74 terminate their trip for bringing the belts 80 and 81 over the user, there are fixedly arranged locking systems 82 and 83 for said shifting means 73 and 74 respectively.

Figure 14:
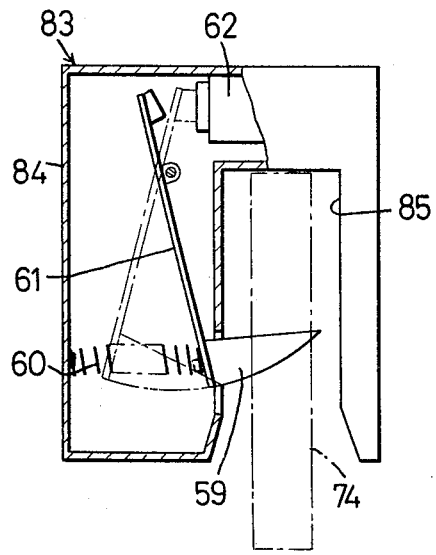
FIG. 14 is a partially-cutaway plan view of the above.

The afore-mentioned locking systems 82 and 83, as shown in FIGS. 13 and 14, have a recessed portion 85 wherein the metal fixture 75 of said shifting means 73 and 74 is inserted upon arrival at the fixing portion 84. This recessed portion 85 is fixed to the underside surface of said rails 71 and 72.

The fixing portion 84 is nearly equivalent in organization to the locking system referred to in the second embodiment. Fixed to the arm rod 61 at the forward tip thereof in said fixing portion 84 is a locking click 59 which moves in and out of the recessed portion 85. A spring 60 for providing a resilience to the locking click 59 is provided, and an electric magnet 62 for magnetizing the arm rod 61 at the base portion thereof magnetically attracts the locking click 59. Said metal fixture 75 is provided with a penetration orifice 86 into which the locking click 59 penetrates when it enters into the recessed portion 85.

The seat belt equipment in the third embodiment of this invention is organized as described above, the functioning is illustrated hereinunder.

Figure 11:
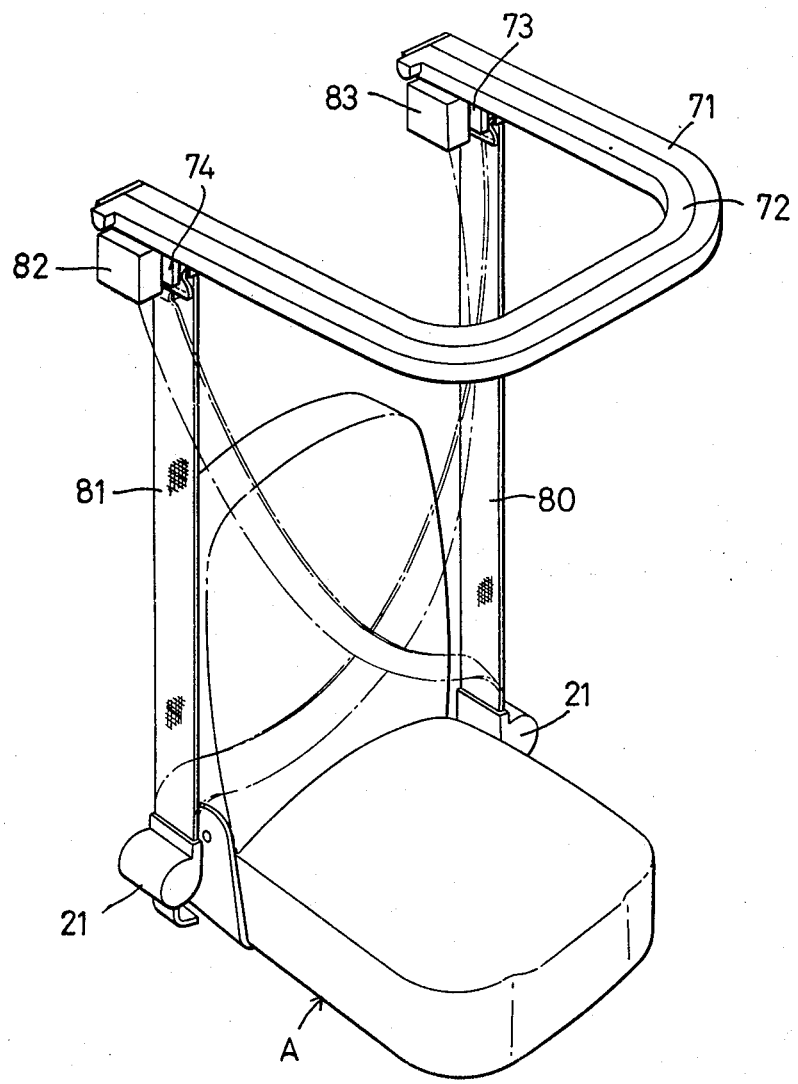
FIG. 11 is a perspective view of this invention in the third embodiment.
Figure 12:
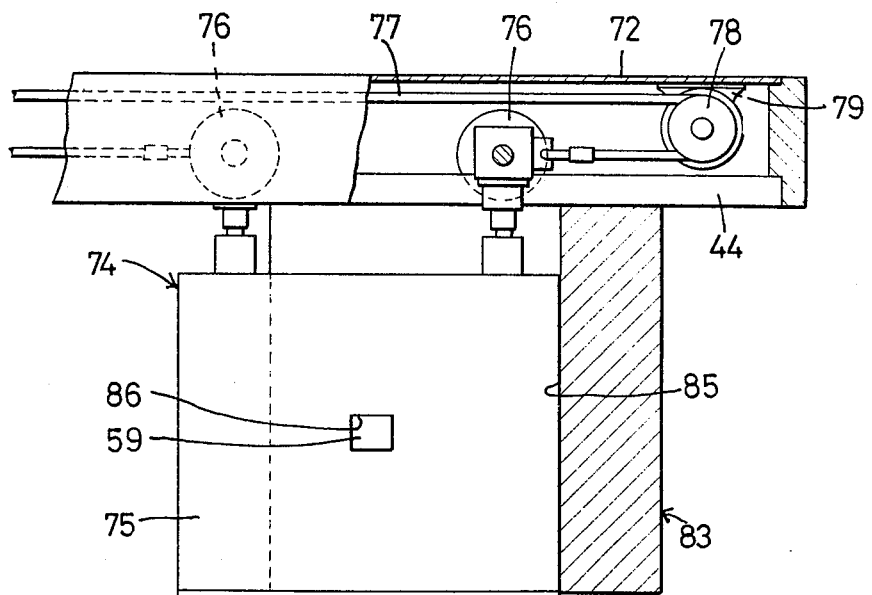
FIG. 12 is a magnified partially-cutaway side view of a shifting means incorporated in the above.

When the seat belt is not in use, the shifting means 73 and 74 are situated at the end portions of the rails right above the winders 21, as shown in FIG. 11 by the solid lines. The belts 80 and 81 confront each other and stretch upward and downward at both sides of the seat A.

In this state, the user sits on the seat A and turns on the motor 79 which enables each of the shifting means 73 and 74 to move along the rails 71 and 72 respectively toward the other ends thereof.

The shifting means 73 and 74 move in directions opposing each other, pass each other at the forward central portion of the rail 71 and 72, and reach a securing state at the end of each rail 71 and 72 where they engage with the locking systems 82 and 83.

The belts 80 and 81, as shown by chain lines in FIG. 11, cross in the traversing way of the shifting means 73 and 74, and thereby fit over the user from waist to shoulder in an X-formation.

To release the user from the belt binding, and return the shifting means 73 and 74 to their original state, the magnet 62 is electrified and the motor 79 is reversed.

In the third embodiment, the seat belt device can be constituted so as to enable the solo use of either of the shifting means 73 and 74 and, accordingly, the use of only one rail.

The fourth embodiment of this invention is shown in FIGS. 15 to 20. Parts functioning and organized the same as those in FIGS. 1 to 14 are designated with the same numerals or marks and are excepted for illustration.

In this embodiment, the shifting means 93 and 94 of the belts 91 and 92 connected to the rails 71 and 72 respectively make a traverse similar to the third embodiment, but different in that when the two shifting means 93 and 94 pass each other, the first belt 91 at the upper end thereof overlaps the second belt 92 by way of slipping from the rail, continuing to descend along the second belt 92 so that the first belt 91 lies over the user's waist.

The first shifting means 93 which travels on the outside rail 71 is organized as shown in FIG. 19, said shifting means 93 being comprised of a shifting member 95 moveable along the rail 71 and a metal fixture 96 detachably fixed to said member 95. Said shifting member 95 is provided at the rear thereof with a horizontal orifice 97 wherein a permanent magnet 98 is incorporated.

The metal fixture 96 comprises at the upper end thereof a hook 99 detachably inserted into said horizontal orifice 97, said hook 99 being held by said magnet 98 at the time of insertion into the horizontal orifice 97, thus enabling the metal fixture 96 to fit to the shifting member 95.

The second shifting means 94 which moves on the inside rail 72 and the second belt 92 connected thereto are organized as shown in FIGS. 16 to 18.

The second belt 92 at the outside central portion thereof is formed longitudinally with a recessed groove 100 which covers the belt from the upper end to the middle of the lower end portion thereof. At the same time, the metal fixture 96 in the form of a thick-wall rectangular panel having at a portion from the lower edge upward thereof a recessed groove 101 communicates with the other recessed groove 100.

The recessed groove 100 of the belt 92, as shown in FIG. 18, is open longitudinally under the effect of a flexible guide member 102 fixed to the outside surface of the belt 92, said recessed groove 100 forming at both sides therein a widened portion to use for engagement. The recessed groove 101 of the metal fixture 96 also has a section the same as the recessed groove 100.

The afore-mentioned recessed groove 100 incorporates a movable engaging member 103 therein longitudinally at its base portion which has a forward edge that projects by a suitable length toward the outside surface of the belt 92 out of the recessed groove 100.

The second belt 92 incorporates a motor 104, and an endless wire 105 is installed longitudinally from the metal fixture 96 toward the second belt 92 to be driven by the said motor 104. Said wire 105 has a movable engaging member 103 somewhere on it, thereby enabling the elevation and traverse of the engaging member 103 along the recess grooves 100 and 101 under the effect of the operation of the motor 104.

In the belt metal fixture 96, as shown in FIG. 20, there is a switch 106 for detecting the ascent into the recessed groove 101 of the movable engaging member 103 and for cutting the power supply to the motor 104. At the lower end of the second belt 92 as shown in FIG. 17, there is another switch 107 for detecting the descent of the engaging member 103 onto the lower terminal of the recess groove 100 and for cutting the power supply to the motor 104.

The movable engaging member 103 at the forward tip thereof projecting out of the belt 92 forms a horizontal engaging hole 108 as shown in FIG. 16, and the inside of the metal fixture 96 at the first shifting member 93 is projectionally fitted with an engaging piece 109 which engages with said engaging hole 108 so as not to slide therefrom when the shifting means 93 and 94 pass each other. The engaging piece 109 forms at the pivot-like forward tip thereof a bigger diameter portion 110 for preventing it from slipping, and said engaging piece 109 fits in the engaging hole 108 from its forward opening at that time.

When the engaging member 103 engages with the engaging piece 109 during the passing-by of the shifting means 93 and 94, the metal fixture 96 of the first shifting means 93 is pulled toward the side of the second shifting means 94, whereas the shifting member 95 of the first shifting means 93 further traverses toward the direction for fixing the belt over the user and outpowers the attractive power of the permanent magnet 98, thus enabling the hook 99 to get away from the horizontal orifice 97 and resulting in the release of said metal fixture 96 from the shifting member 95.

A switch (not shown) is installed in the metal fixture 96 of the second shifting means 94; said switch detects the engagement of the engaging piece 109 with the movable engaging member 103 and turns on the electric motor 104 for lowering said engaging member 103. The second belt 92 at the lower portion thereof, as shown in FIG. 17, is formed with a steel panel 111 so as to add to the durability of said belt against tension at the time of the engagement of the first belt 91 at the upper end thereof with said second belt 92 at the lower end thereof.

The recessed groove 100 at its side at the lower end of the second belt 92 incorporates a locking system 112 for preventing the ascent of the lowered engaging member 103 as shown in FIG. 17, said locking system 112 having a constitution the same as the locking system 55 in the second embodiment.

A projecting wall member 113 is formed longitudinally along the recessed groove 100 of the belt 92 at its outside surface. Said projecting wall member 113 prevents the engaging piece 109 from slipping away from the engaging member 103 at the same time of its fall along the recess groove 100, and said second belt 92 at the lower end thereof is provided with a buckle 114 to be used for an emergency escape of the user therefrom.

The rails 71 and 72 at their ends are equipped with locking systems for locking the oncoming shifting means as in case of the system shown in FIGS. 13 and 14.

The seat belt device of this invention in the fourth embodiment has a constitution as apparent in the foregoing illustration; the functioning is explained below.

Figure 15:
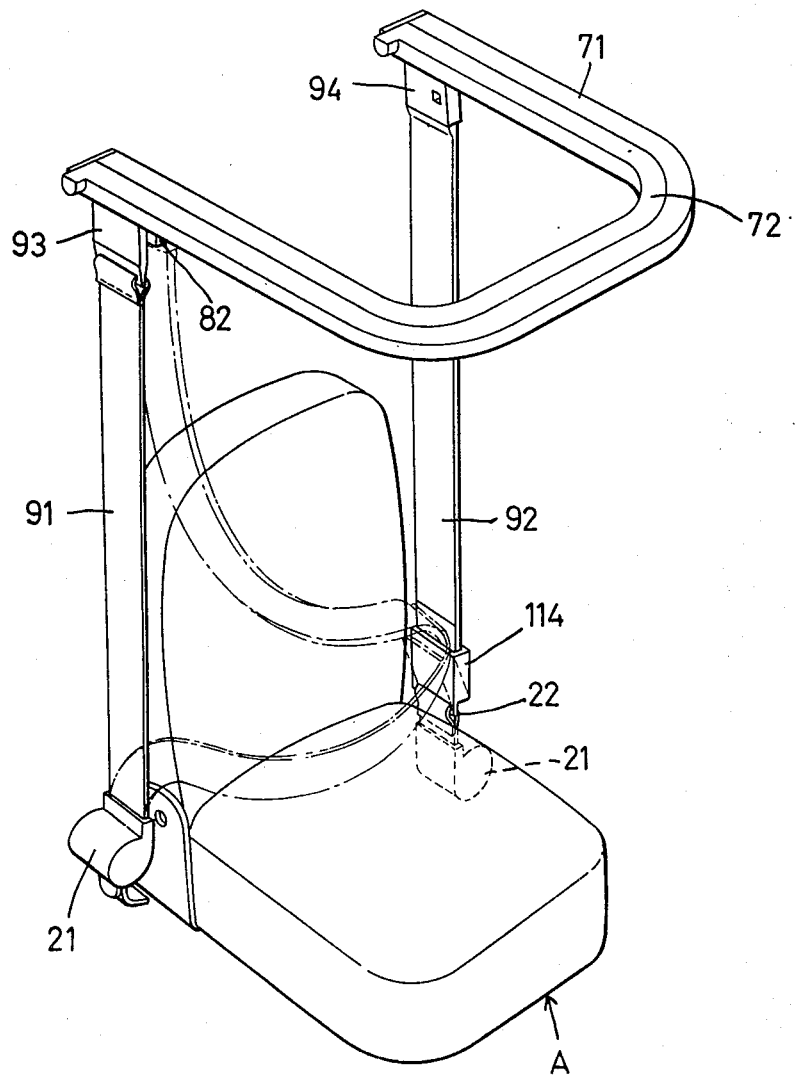
FIG. 15 is a perspective view of this invention in the fourth embodiment.

When the belt equipment is not in use, as shown in FIG. 15, the belts 91 and 92 at both sides of the seat A are stretched upward confronting each other.

In the foregoing state, the user sits on the seat A and starts the motor 79 for moving the shifting means 93 and 94 toward the other end portions of the rails 71 and 72 respectively. Both of the shifting means 93 and 94 move toward directions opposing each other thereby crossing at the forward central portion of the rail 71 and 72.

At the time of the above-described crossing of said shifting means 93 and 94, the engaging piece 109 fits in and engages with the engaging member 103, thereby enabling the first shifting means 93 of the first belt 91 at the metal fixture 96 thereof to slide away from the shifting member 95 and transfer itself to the second belt 92 at its upper end thereof.

After the engagement of the engaging piece 109 with the engaging member 103, the motor 104 is started and moves the engaging member 103 downward along the recessed groove 100 of the second belt 92.

Accordingly, the first belt 91 at the upper end thereof becomes the user's waist belt after said descent, while the second belt 92 becomes the shoulder belt covering the user from waist to shoulder. Both of the belts 91 and 92 at the upper ends thereof are locked at a predetermined position by the locking system 82 and 112, as shown by chain lines in FIG. 15.

To release the user from the belt binding, reversed rotation of the motors 79 and 104 initiated by a switch (not shown) provided for that purpose will return the belts 91 and 92 to their original state as shown in FIG. 15.

What is claimed is:

1. A seat belt device for use with a seat, said device comprising:

seat belt means;

seat belt winding means at the lower side of said seat and connected to one end of said seat belt means for retracting said seat belt means thereinto;

rotatable arm means pivotably mounted at one end thereof above said seat and said winding means, extending forward therefrom, and connected at the forward end to the end of said seat belt means opposite the end of said seat belt means connected to said winding means for pivotably rotating and withdrawing said seat belt means from said winding means across said seat, whereby a person seated on said seat is crossed by said seat belt means extending from said winding means to said pivoted arm means; and locking means mounted above said seat on the side thereof opposite said winding means at the end of the arc defined by said pivotable arm means for engaging and securing said arm means when said arm means is pivoted and said seat belt means is withdrawn from said winding means.

2. A device as claimed in claim 1 further comprising adjustable connecting means at the forward end of said arm means and connected to said seat belt means for adjusting the positioning of said seat belt means along said arm means.

3. A device as claimed in claim 1 wherein said arm means has a spring mounted therein for returning said rotated arm means to a forwardly projecting position.

* * * * *